(12) United States Patent
Griffith

(10) Patent No.: US 8,142,121 B2
(45) Date of Patent: Mar. 27, 2012

(54) VEHICLE BED COVER, PULL-STRAP/ TIE-DOWN

(76) Inventor: Matthew Mark Griffith, Anderson, SC (US)

(*) Notice: Subject to any disclaimer, the term of this patent is extended or adjusted under 35 U.S.C. 154(b) by 211 days.

(21) Appl. No.: 12/798,408

(22) Filed: Apr. 2, 2010

(65) Prior Publication Data
US 2011/0243681 A1 Oct. 6, 2011

(51) Int. Cl.
*B60P 7/08* (2006.01)
(52) U.S. Cl. .......................................... 410/97
(58) Field of Classification Search .................... 410/97, 410/100, 118, 96; 160/237; 296/100.01, 296/39.2, 100.15, 100.16; 150/166
See application file for complete search history.

(56) References Cited

U.S. PATENT DOCUMENTS

| | | | |
|---|---|---|---|
| 4,607,876 A | 8/1986 | Reed | |
| 4,739,528 A | 4/1988 | Allen | |
| 5,050,924 A | 9/1991 | Hansen | |
| 6,224,139 B1 | 5/2001 | Weyand | |
| 7,217,074 B1 * | 5/2007 | Huber | 410/118 |
| 7,229,121 B2 | 6/2007 | Fox et al. | |
| 7,837,421 B1 * | 11/2010 | Rowe | 410/34 |

* cited by examiner

*Primary Examiner* — Stephen Gordon
(74) *Attorney, Agent, or Firm* — Stephen R. Chapman

(57) ABSTRACT

The subject matter of the invention is generally related to automotive accessories. Specifically, it is a device adapted to covering the bed of a pick-up truck, or similar vehicle, including comparable utility trailers. In addition to covering the bed, the device covers the area of an open tailgate and is adapted to cover loads of varying heights by deploying attached side panels. The disclosed device further includes a strap system that connects to the cover and secures the load; in addition it serves as an aid in pulling loads from the bed. Finally the invention describes three systems to anchor the cover to the vehicle, each of which accommodates deployment of the side panels and each of which provides a degree of flexibility to cover loads of varying height.

4 Claims, 17 Drawing Sheets

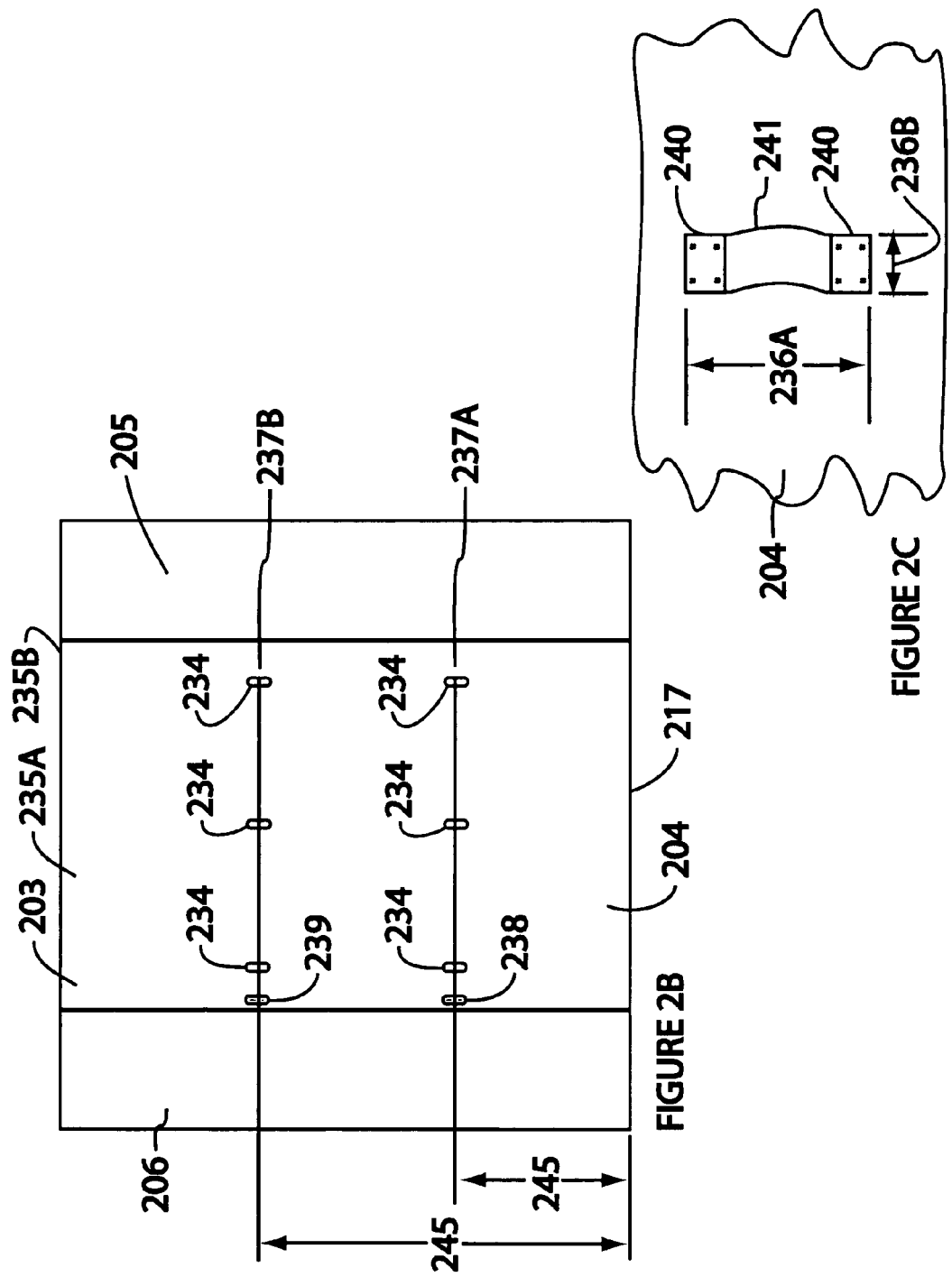

VEHICLE BED COVER, PULL-STRAP/TIE-DOWN

FIELD OF THE INVENTION

This invention relates to automotive accessories, specifically to pickup trucks, and even more specifically to a device that jointly serves to cover the load carries in a pickup bed and to secure the load in the bed.

BACKGROUND

The pickup truck has been part of the American automotive industry since at least 1925, when the first fully assembled pickup truck was manufactured, the Model T Ford Runabout with a pickup body. In spite of the obvious evolution of these popular vehicles, covers to protect and secure loads carried in the bed have not been perfected.

Pickup campers, particularly the "low line" or "cab-high" models serve effectively as "bed covers" and effectively convert the open bed to a more secure, protected space; however, in addition to expense, some utility of the vehicle is lost owing to loss of flexibility associated with the rigid walls and top of the camper, as well as restriction on the ease of loading and unloading materials from the bed. Generally, campers are not well suited as bed covers for pickup trucks used to transport large and varied loads of heavy and/or waste materials. Similarly, a wide variety of slide-on/snap-on or hinged covers that are attached to the upper surface of the side and end walls (the perimeter) of the bed are available. Such covers are generally positioned flat on the upper surface of the bed and are made of solid material or tightly stretched fabric; they protect materials in the bed, but the height of a load is limited to the height of the sidewalls. Such covers are frequently considered to enhance the appearance of the vehicle.

Many pickup owners/operators seek a simple, removable bed cover for two purposes: to reasonably protect a load in transit from dirt and debris and from precipitation, and/or to prevent (or minimize) material (frequently yard and garden waste and household garbage) from blowing from the bed, causing an accident or adding to road side litter. Many jurisdictions mandate the use of a load cover by vehicles transporting waste to minimize, if not prevent the discharge and spread of road side litter. In response to anti-littering regulations, most large, commercial, waste-hauling vehicles are equipped with a bed (load) cover that is deployed and retracted by some type of mechanical arm. Pickup owners/operators face the same types of anti-litter regulations and civic obligations related to litter control. Recognition of the need for means to cover pickup beds is not new.

The apparently original bed cover remains in popular use, a tarpaulin of dimensions equal to or somewhat greater than the pickup bed to be covered and adequate rope to secure the tarpaulin over the load and to secure the load in the bed. Most pickups are equipped with at least adequate points of attachment in the corners of the bed for securing a cover and/or load.

Numerous variations of pickup bed covers have been the subject matter of United States patents. Many have claims for multiple uses, such as U.S. Pat. No. 4,607,876 issued to Reed Aug. 26, 1986 and described as a tensional cover for the bed of a pickup, or a collapsible tent. See also Allen, U.S. Pat. No. 4,739,528 issued Apr. 26, 1988 for related technology including a frame to secure tie-down ropes that can also be used as a sleeping surface.

In terms of devices designed to cover loads being transported in the bed of a pickup truck, U.S. Pat. No. 5,050,924 issued Sep. 24, 1991 to Hansen discloses improvements on the basic "tarpaulin/rope tie down system." A series of elasticized straps is attached to a tarpaulin in the pattern of a series of X's such that interstitial sections of the straps (sections between segments of the same strap connected to the tarpaulin) are stretched before being attached to the tarpaulin. Ends of the straps are attached to the pickup bed at corners and mid-points of the bed. After the bed is loaded, the tarpaulin is stretched over the load and connected to the pickup bed, the tension on the straps is released, tightening the cover over the load. The invention includes an elastic cord encased in a seam to secure the bottom edge of the tarpaulin. A significant limitation to this scheme is the limited degree of expansion/retraction allowed by the attached elasticized cords.

Weyand in U.S. Pat. No. 6,224,139 issued May 1, 2001 discloses a bed cover comprising a tarpaulin with a fabric cover sheet with lengths of elastic band positioned in a hem extending along a portion of the perimeter of the tarpaulin. Spaced cutouts are positioned at corners and elsewhere exposing part of the elastic band and permitting the elastic band to be stretched from the hem and be connected to a hook structure on the pickup bed (or other portion of the vehicle) to secure the tarpaulin and to cover the bed. Individual lengths of elastic band are secured in the material by a loop around a rivet. This design provides a good fit for a specific area, but allows little flexibility for expansion for varying loads and has no significant strength to secure, or tie down the load. It found specific use in protecting equipment in specific areas of certain types of emergency vehicles.

Fox and Fox in U.S. Pat. No. 7,229,121 issued Jul. 12, 2007 describe a covering device for a pickup bed or similar structure comprising a cover with a cord positioned in a sheath formed from the cover and extending the full perimeter of the cover. The cord is exposed at various points along the perimeter of the cover, including the corners. The cover is securely connected to the vehicle by hooks connecting the exposed cord to points at the corners and elsewhere in the bed of the pickup. This invention provides a flat cover for the bed that is tight, and many feel it enhances the appearance of the vehicle. it offers little flexibility in terms of adaptation to load size and provides no load tie-down security.

SUMMARY OF THE INVENTION

A desirable pickup bed cover should be easy to attach to the vehicle (and to remove when not needed), should attach securely to the vehicle, should provide flexibility as to the size and configuration of loads that can be properly covered, and should be integrated with means to secure the load in the bed of the pickup.

A purpose and goal of the invention is a device that covers both the bed of a pick-up truck and the extended tailgate.

A second purpose and goal of the invention is a device that is adapted to cover loads of varying heights in the pick-up bed.

A further purpose and goal of the invention is a structure that is connected to the cover and secures the load in the bed and that also provides assistance in extracting a load from the bed.

An additional purpose and goal of the invention one or more anchor systems that connect the pick-up bed to the cover and that provide adjustable flexibility in covering loads of different heights in the pick-up bed and further that serve to hold the cover reasonable tightly over the bed when it is in use.

These and other purposes and goals are achieved by a vehicle bed cover/tie-down device which includes a fabric bed cover that covers the bed of a pick-up truck with side panels attached to the bed cover that allow covering loads of varying heights above the depth of the pick-up bed and are attached to the main bed cover such that when the main panel is moved upward, the side panels deploy to cover the exposes sides of a load; and a tailgate cover that covers the tailgate when it is in the down (open) position to accommodate loads longer than the bed, and further includes a strap system that consists of a main strap that is positioned on the floor of the pick-up bed and two belts, each of which is divided into a long arm and a short arm, by the point of attachment of each belt on the main strap and that extend at right angle from the main strap, and in which each long arm passes through the members of a set of belt guides that are positioned on the inner surface of the main cover, wrapping around the load in the pick-up bed and each belt extends to the outside of the main cover and connects with the corresponding buckle on each short arm, to secure both the cover and the load, and when the belts are disconnected, the main strap serves as a base to assist in extracting the load from the bed; the vehicle cover/tie-down further includes more than one system to releasably connect the main cover to the pick-up bed; the systems all have a body part with one end secured to a point near each of the four corners of the main cover, and connector devices adapted to releasably connect the body (hence the main cover) to the vehicle; such devices include carbineers; the main body of each anchor system has the capability to stretch in length, thereby allowing the main panel and connected side panels to cover loads of varying heights and to secure the main panel to the vehicle; in one system, the body is fabricated from elastic cord (bungee cord), and the extent of stretch is limited by the flexibility of the elastic cord; in a second system, the body comprises a belt, the length of which can be extended through connection of its two parts by a buckle; the degree of stretch is limited by the length of the free end of the belt; in a third system, the body is connected anchored to the main panel by a first end and the spacing points of connection on the body part in relation to the connection points in the pick-up bed determine in part the extent the body part apparently stretches; however, in addition, a continuous length of elastic cord connects the first end of each body part to a central anchor point, such that by selection of the point of connection on the body part combined with the elasticity of the cord, the cover can extend to its maximum height and also, by tension of the elastic cord, can be tautly stretched over the bed, a feature generally shared with the other two systems.

BRIEF DESCRIPTION OF THE DRAWINGS

FIG. 2B illustrates the under surface of the bed cover with strap guides and access slots.

FIG. 2C illustrates details of a strap guide system.

EXAMPLES

Example 1

Background Information, Pickup Bed Structure/Dimensions

Understanding how the bed cover/tie-down device functions is facilitated by a brief review of the parts of the bed of any "standard" pickup truck. Unnecessary parts in relation to the invention are omitted. Throughout all of the following discussion and examples and all figures, the same guide numbers are used consistently for the same part and/or function as initially introduced, and duplicated discussion is minimized following the initial introduction, description, and discussion of a specific part, function, or structure.

Although the invention is described in terms of adaptations to the bed of a pickup truck, one of average skill in the art recognizes that it is fully adaptable to utility trailers of dimensions comparable to those of many "standard" pickup trucks. Thus, applications to utility trailers are anticipated, as appropriate, for all of the following examples.

Figure 1:
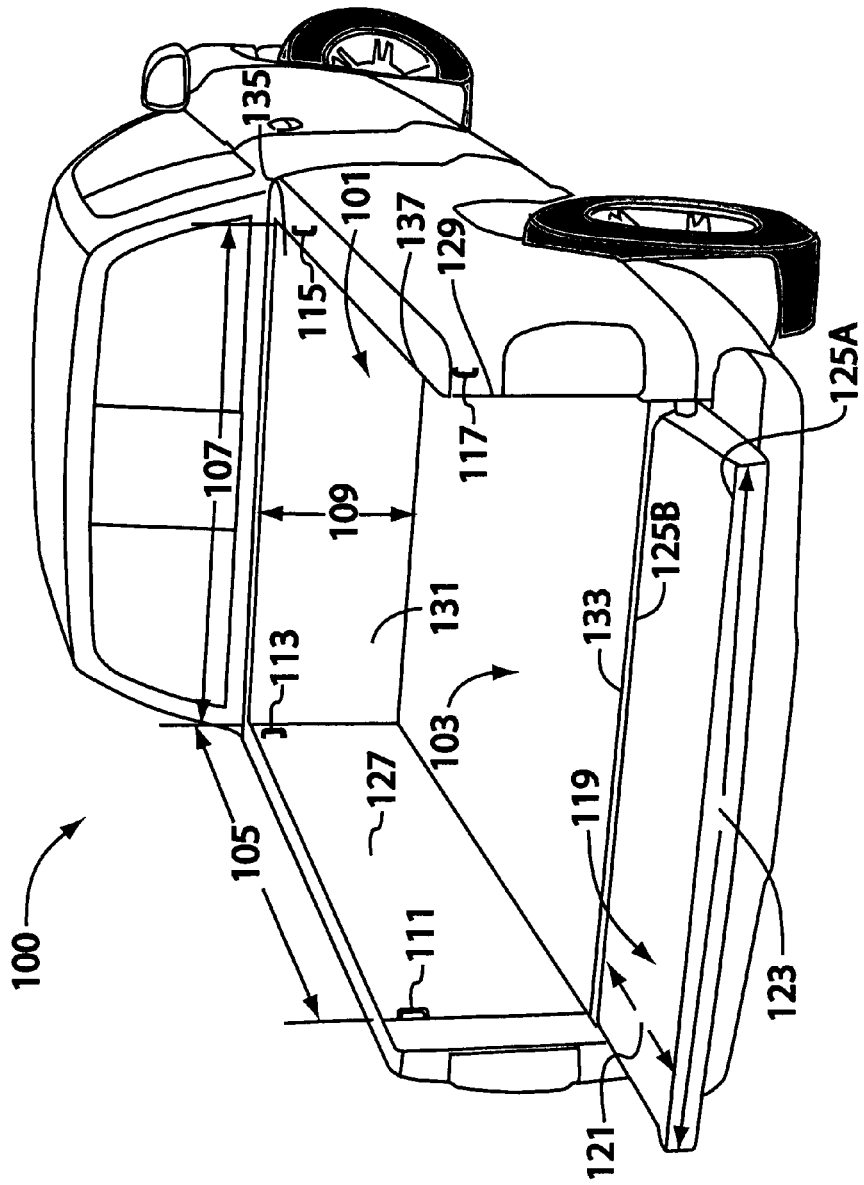
FIG. 1 illustrates prior art, the basic parts and dimensions of the bed of a pickup truck.

As illustrated in FIG. 1, the pickup truck 100 comprises a bed 101 in the configuration of a five-sided box: a floor 103, a left side wall 127, a front wall 131, a right side wall 129, and a tailgate 119. The tailgate 119 is illustrated in the open, or down position; as such it is effectively an extension of the floor 103. In the closed position (not illustrated), tailgate 119 is at a right angle to the floor 103, parallel to the front wall 131, and constitutes the rear wall of the pickup bed 101. Width of the tailgate 123 is the same as the overall width of the bed 107, and length of the tailgate 121 is the same as its height when in the closed position and is the same as the depth of the bed 109. The top edge 125A and bottom edge 125B of the tailgate are also shown. Length of the bed 105 is measured from the front edge 135 to the rear edge 133 of the bed 101. With respect to vehicles manufactured United States, width of the bed 107 varies, but is not limited to, from about 4 to 5.5 feet, length 105 varies more, from about 4.5 to over 8 feet, and depth (height) 109 from about 2.5 to 3.5 feet (1.2 to 1.7 m; 1.1 to over 2.4 m; and 0.75 to 1.7 m, respectively).

The four tie-down points are included as standard equipment in most new pickup trucks. They are positioned in or near the left rear 111, left front 113, right front 115, and right rear 117 corners of the bed, and generally near the upper edge of the bed 137 and may be a variety of structures, including, but not limited to variations of U-bolts, hook and I-bolts, and cleats. If not standard equipment, the invention reasonably assumes tie-down points will be positioned as described above and secured in the bed of the pickup. For convenience, the bed corner and associated tie-down structures share a common index designation.

Example 2

Over View of Fabric Cover Element

Figure 2A:
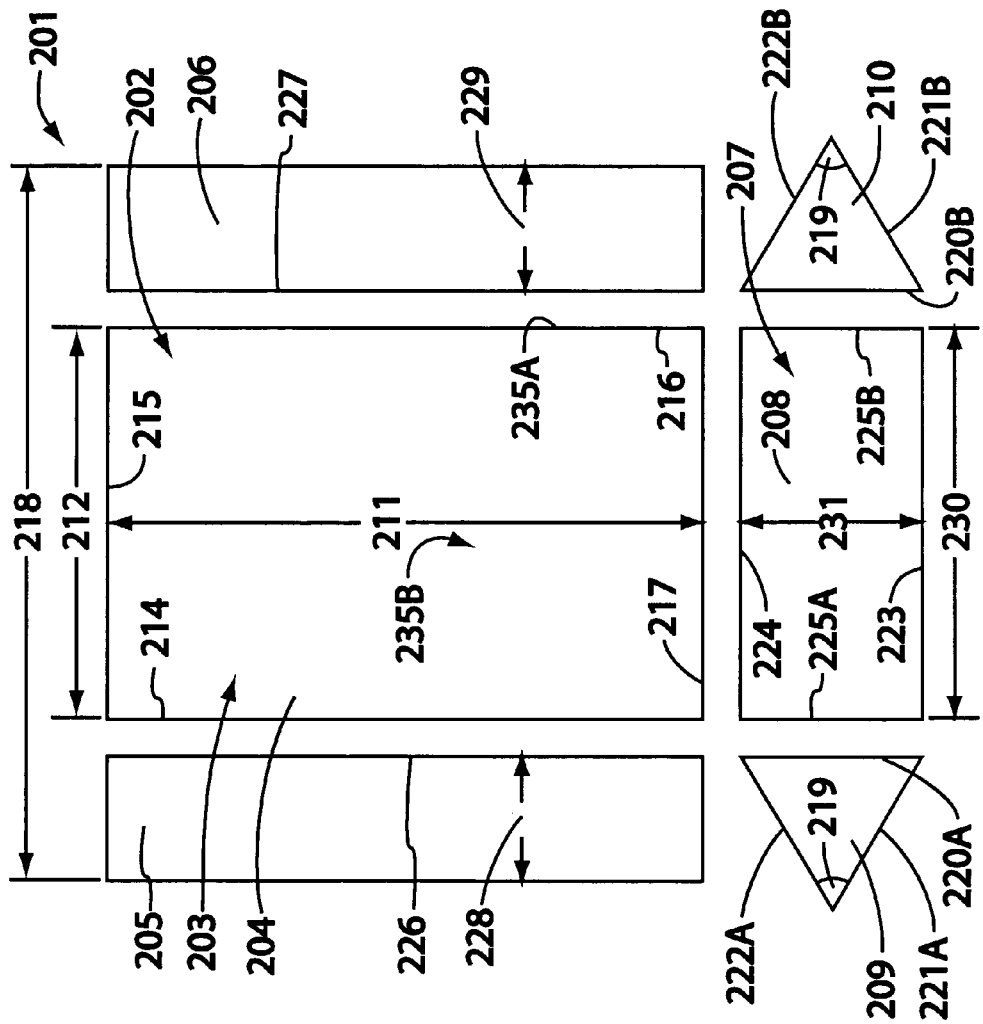
FIG. 2A illustrates the top surface of the fabric cover element showing the parts, their relative relationships, and sizes.

FIG. 2A provides a top view 201 of the relative size, shape, and orientation of the six pieces of fabric that comprise the fabric cover element 202 of the invention. The fabric cover element 202 comprises two main parts: the bed cover 203 and the tailgate cover 207. The bed cover 203 comprises three pieces: the main panel 204, a left side panel 205, and a right side panel 206. Similarly, the tailgate cover 207 comprises three pieces: the rear cover panel 208, a left rear side panel 209, and a right rear side panel 210.

The rectangular, main panel 204 has a length 211 and a width 212, and is limited or described by a left edge 214, a front edge 215, a right edge 216, and a back edge 217. The length of the main panel 211 is generally equal to, or slightly greater than the length of the bed 105. By way of example, not limitation, for standard US vehicles, the length varies from about 4.5 to 8 feet (1.1 to 2.4 m). The width of the main panel 212 is at least equal to the width of the bed 107, and commonly 0.5 to 1.5 feet (15 to 45 cm), or more greater than the width of the bed 107. For reference, the inner 235A and outer 235B surfaces of the main panel 204 are indicated.

The left and right side panels 205 and 206, respectively, are equal in length and are the same length 211 as the main panel 204. The left 205 and right 206 side panels are equal in width 228 and 229, respectively. The practical, maximum width of the side panels 228 and 229 is generally no greater than the depth 109 of the pickup bed, and may be less; however greater width does not constitute a limitation to the invention.

The main panel left edge 214 is connected to the left side panel inside edge 226, and the main panel right edge 216 is connected to the right side panel inside edge 227 to form bed cover 203.

The width 230 of the rear cover panel 208 is equal to the width 212 of the main panel 204. The length of the rear cover panel 231 is equal to the bed depth 109 and height 121 of the tail gate.

The left rear 209 and right rear 210 side panels describe triangles. The long edge of the left 220A and right 220B rear side panels 209 and 210, respectively, is connected to the corresponding left edge 225A or right edge 225B of the rear cover panel 208. The rear cover panel front edge 224 is connected to the main panel back edge 217 The left 221A and right 221B base edges of the left and right rear side panels, respectively contact the extended tailgate and each forms a right angle 219 with the corresponding left 222A or right 222B vertical edge of the left and right rear side panels, respectively, as they are oriented when the rear cover is installed. Connecting the rear side panels to the rear cover panel and connecting the rear cover panel to bed cover 203 completes the fabric cover element.

FIGS. 2B and 2C illustrate structural details of the inner surface 235A of the bed cover 203 (main panel 204 with left 205 and right 206 side panels attached). Note, in FIG. 2B, because the view is from the interior, the position of the left side panel 205 and right side 206 panels is reversed. Members of the first set 237A and a second set 237B of belt guides 234 are attached to the inner surface 235A of the bed cover 203 with each belt guide 234 aligned such that the belt passage 241 is parallel to the main panel back edge 217. FIG. 2B further illustrates the first 238 and second 239 belt access slots aligned with the first 237A and second 237B set of belt guides. The belt access slots are openings through the main panel 204. The first long arm 421 and second long arm 427 of the tie-down/pull-strap element 401, FIG. 4, pass through the corresponding belt guides on the inner surface 235A of the main panel 204 and each long arm passes through a belt access slot to the outer surface 235B of the main panel where ultimately each long arm is connected to its corresponding short arm 433 and 439 to complete securing a load with the tie-down/pull-strap element.

Each set of belt guides 237A and 237B comprises at least three and (as illustrated) up to five belt guides 234. Each belt guide varies from approximately 3 to 6 inches (7.5 to 15 cm) in length 236A and 0.5 to 1.5 (0.75 to 2.00 cm) in width 236B. Each end 240 of the belt guide is attached to the inner surface of the bed cover, thereby forming the belt passage 241. The length of the attached surface varies from 0.5 to 1.0 inch (1.25 to 2.5 cm).

Example 3

Fabric Cover Installed

Figure 3A:
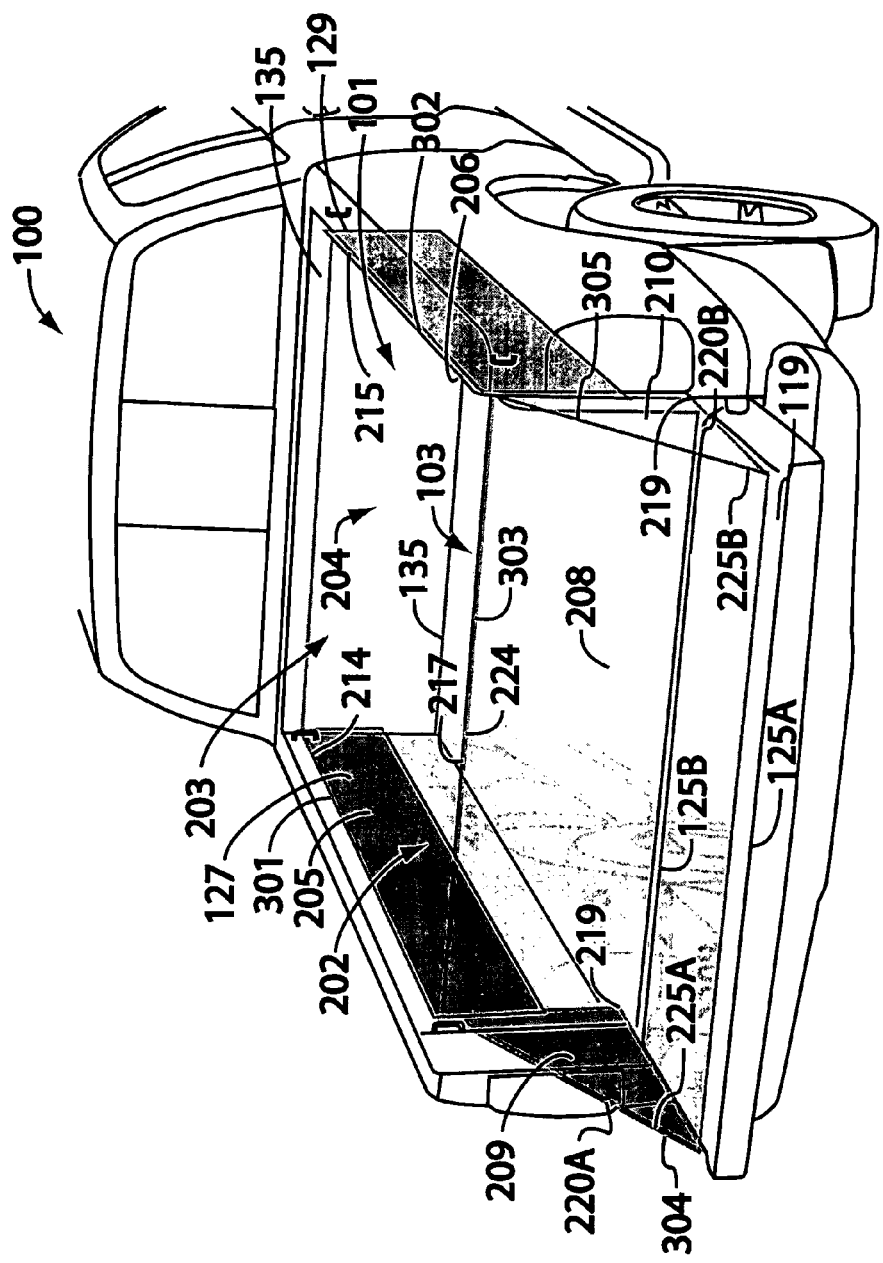
FIG. 3A provides a schematic illustration of the fabric element installed in the pickup bed.

FIG. 3A illustrates the fabric cover element 202 positioned over The bed 101 and open tailgate 119 of a pickup truck 100. Also indicated for reference are the left side wall 127 of the bed, the right side wall 129 of the bed, the front edge of the bed 135, and the top edge of the tailgate 125A and the bottom edge of the tail gate 125B.

The bed cover is positioned generally above the bed floor 103. The left 205 and right 206 side panels descend into the bed up to or slightly greater than the depth of the bed. The left and right side panels 205 and 206, respectively, are connected to the left 214 and right 215 edges of the main panel 204 by seams 301 and 302 respectively.

The rear cover panel 208 is connected along the main panel back edge 217 and rear panel cover front edge by 224 by seam 303. The left rear side panel 209 is connect along its long edge 220A to the left edge 225A of the of the rear panel cover 208 forming seam 304, and the right rear side panel 210 is attached by seam 305 joining its long edge 220B to the right edge seam 225B of the rear panel cover 208.

Figure 3B:
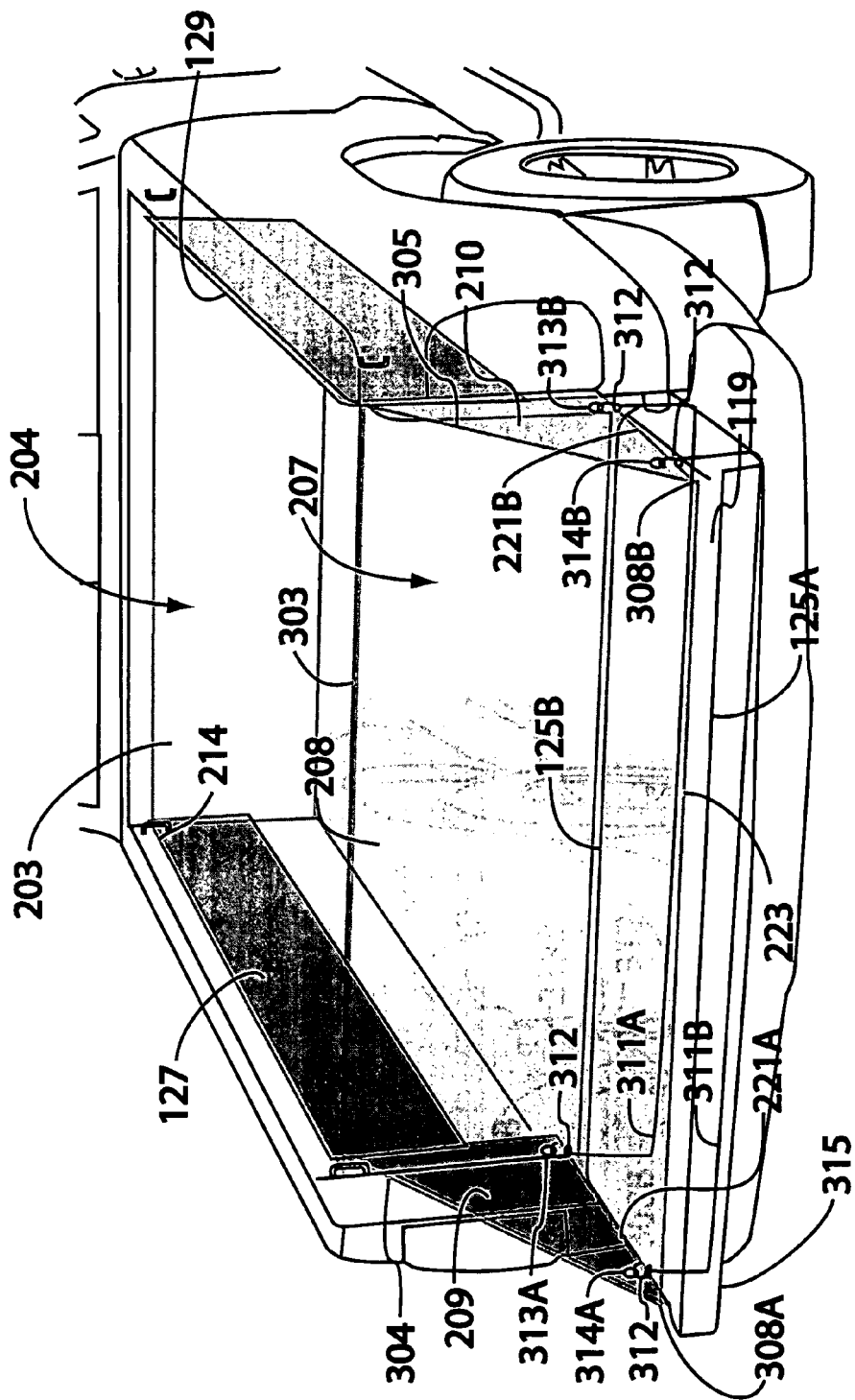
FIG. 3B is a detailed illustration of the installed tailgate cover.

FIG. 3B illustrates details of the tailgate cover 207 positioned over the tailgate 119 in the open position and anchoring the tailgate cover 207 to the tailgate 119. For reference, the left and right side wall 127 and 129 of the bed are indicated along with the main panel 204, rear cover panel 208, left and right rear side panels 209 and 210, and the seams 303, 304, and 305 joining the main panel and rear cover panel (303), joining the left rear side panel and rear cover panel (304), and joining the right rear side panel and rear cover panel (305).

The members of each of two pairs of rear side panel anchor points 313A/B and 314A/B are positioned along the left 221A and right 2213 base edges of the left rear side panel 209 and right rear side panel 210. Members of the first pair of attachment points 313A and 313B are positioned near the right angle point 219 (FIG. 3A) of both rear side wall panels, and members of the second pair of side panel anchor points 314A and 314B are positioned near the distal point 308A and 308B of the left rear 209 and right rear 210 side panels.

The tailgate cover 207 is secured to the tailgate 119 by a pair of lateral elastic tie-down cords 311A and 3113. The length of each lateral elastic tie-down cord is approximately equal to the width 107 of the tailgate 119. Tie-down connectors 312 are secured to both ends of each lateral elastic tie-down cord 311A and 311B.

Members of two pairs of anchor points are positioned in the left 209 and right 210 rear side panels, near the corresponding base edge 221A and 221B, respectively. Members of the first pair 313A and 313B are positioned near the bottom edge 125B of the tail gate 119, and members of the second pair are positioned near the top edge 125A of the tail gate 119.

The tie-down connectors 312 are adapted to be secured in a cord anchor point, 313A, 313B, 314A or 314B. The lateral elastic tie-down cords 311A and 311B extend along the width of the tailgate on the exterior side 315 of the tailgate, thereby securing the tailgate cover 207 to the tailgate 119.

One skilled in the art recognizes that a variety of anchor points and cord connectors is possible in various combinations, including merely knotting the cord in a re-enforced opening (anchor point). All such variations are anticipated by the invention.

All parts of the fabric element, except the belt guides are manufactured from a variety of natural and artificial fibers, including, but not limited to cotton and nylon, and if the material is not normally at least water repellant, it is treated to be water repellant. The belt guides are fabricated from natural of artificial belt material.

Example 4

Tie-Down/Pull-Strap Element

Figure 4:
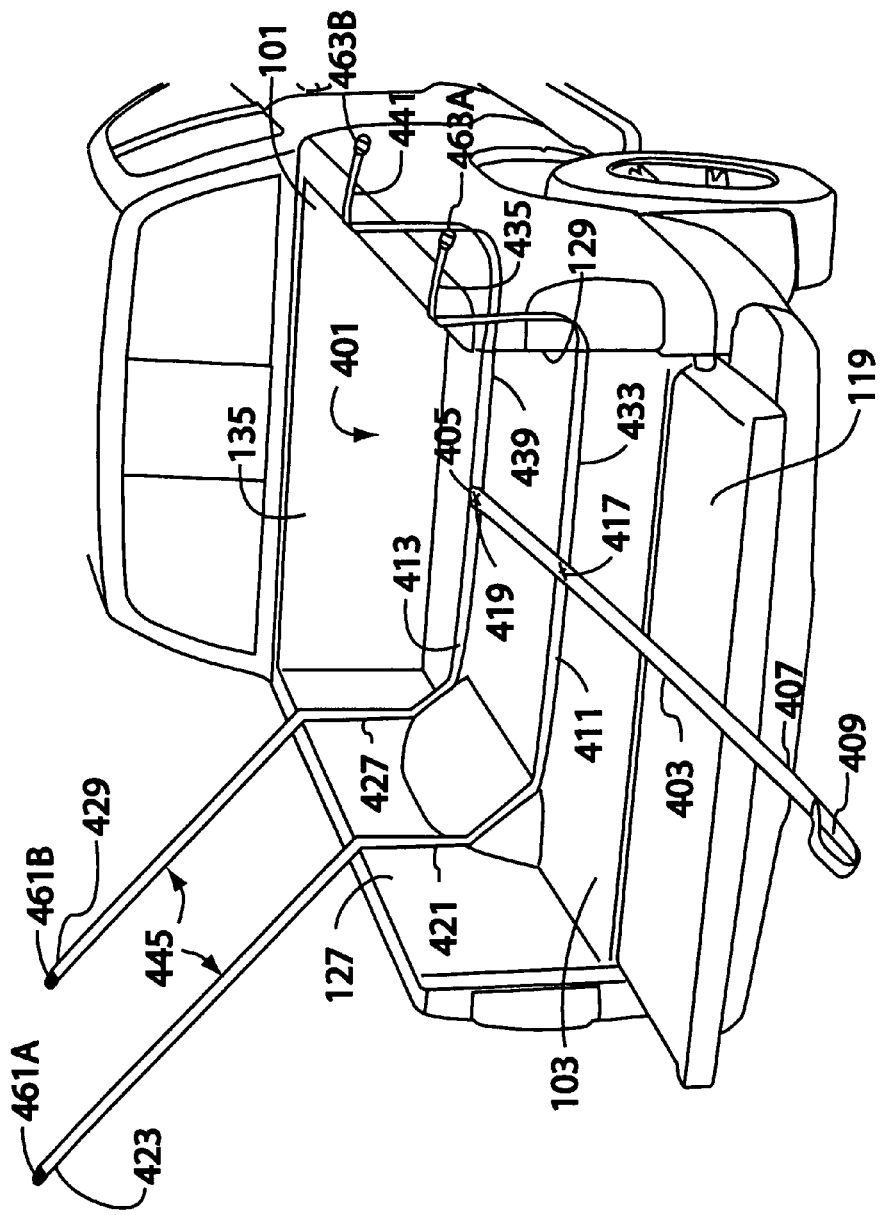
FIG. 4 illustrates load tie-down/pull-strap system.

The tie-down/pull-strap element 401 as illustrated in FIG. 4 serves two functions: to secure, in part, the bed load to the vehicle by a belt system, and to provide a simple, convenient means to assist pulling large, bulky loads from the bed. The tie-down/pull-strap element 401 comprises two major parts: a central strap 403 and a belt system 445 comprising a first belt 411 and a second belt 413, each connected at right angle to the central strap 403 as illustrated in FIG. 4.

The central strap 403 has a distal end 405 and a proximal end 407 in which a grip-loop 409 is formed by folding a short length of the proximal end back and attaching it to the central strap 403, as illustrated. The proximal end extends beyond the length of the pickup bed to facilitate grasping and pulling to unload the bed. The distal end 405 may, but is not require to extend to the front edge 135 of the bed.

The first and second belts 411 and 413, respectively, each comprise a long arm 421 and 427, respectively, and a corresponding short arm 433 and 439, respectively. The first belt 411 is secured to a first connector point 417 on the central strap 403. The first connector point 417 is positioned on the central strap a distance approximately 40 percent of the length 105 of the bed 103 from the rear edge of the bed, and the second connector point 419 is positioned approximately 80 percent of the length 105 of the bed from the rear edge 135 of the bed. Positioning the first 411 and second 413 belts in these relative spacings ensures acceptable alignment of the long arm of the first belt 421 and the long arm of the second belt 427 with the members of the first set of belt guides 237A and the members of the second set of belt guides 237B, respectively, when the tie-down/pull-strap element is positioned on the floor of the pickup for loading.

Figure 5:
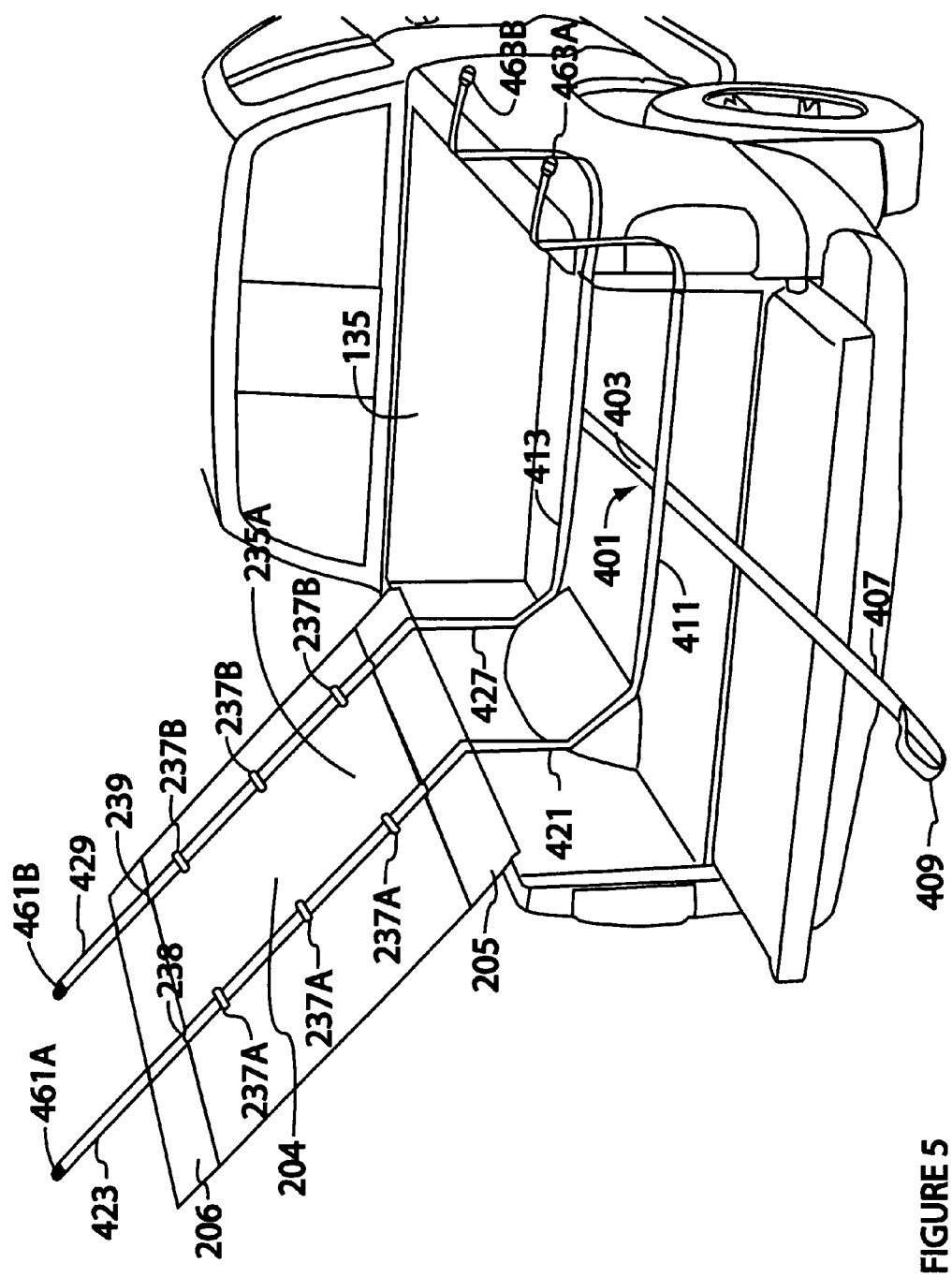
FIG. 5 illustrates tie-down strap system with belts connected to bed cover.

The long arm of each belt 421 and 427, as illustrated in FIG. 4 and FIG. 5, extends at right angle to the central strap 403 to the left side of the pickup bed 101. Each traverses the floor 103 of the bed 101, extends up the left side wall 127, and continues a length adequate to circumscribe a load positioned in the pickup bed and connect to the corresponding first belt 433 and second belt 439 short arms, respectively. The distal ends 423 and 429 of each of the long arms terminate in the male belt connector element 461A and 461B. The first belt short arm 433 and second belt short arm 439 traverse the floor of the pickup bed 103 to the right and extend up the right side wall 129. Each belt short arm 433 and 439 extends a length above the edge of the bed. The distal ends of the corresponding short arms 435 and 441 terminate in a corresponding female belt connector 463A and 463B. The distal ends of the long arms 423 and 429 passes through the first and second belt access slots 238 and 239 to allow the arms to be connected. The male and female belt connectors function as pairs 461A and 463A, and 461B and 463B. Commonly, the female belt connectors 463A/B are any of a wide variety of widely known buckle devices, allowing slack in the corresponding long arms 421 and 427 to be taken up, each belt 411 and 413 thereby being tightened and secured around the load.

FIG. 5 illustrates the main panel 204 connected to the load tie-down/pull-strap element 401. The first belt long arm 421 is passed though the members of the first set of belt guides 237A via each guide channel 241, and the distal end 423 of the first belt long arm first 421 passes through the first belt access slot 238. Similarly, the second belt long arm 427 passes through the corresponding guide channels 241 of each member of the second set of belt guides 237B and the distal end of the second belt long arm 429 passes through the second belt access slot 239. The left/right side orientation can be reversed without changing or expanding the scope or intent of the invention and such optional reversal is anticipated by the invention.

Main Cover Attachment or Anchor Systems

Each of the following three systems and devices by which the main panel may be connected to the bed of the pickup truck or utility trailer assumes the preceding structures and functions associated with the inner surface 235A of the bed cover 203 and the load tie-down/pull-strap element 401. Each anchor system may be characterized as comprising an attachment point on each corner of the main panel and an attachment unit comprising a length of flexible material with a connection device attached to the first end; this connection device engages a tie-down point in the vehicle bed. The second end engages the attachment point on the main panel.

Example 5

Main Panel Anchors

Figure 6A:
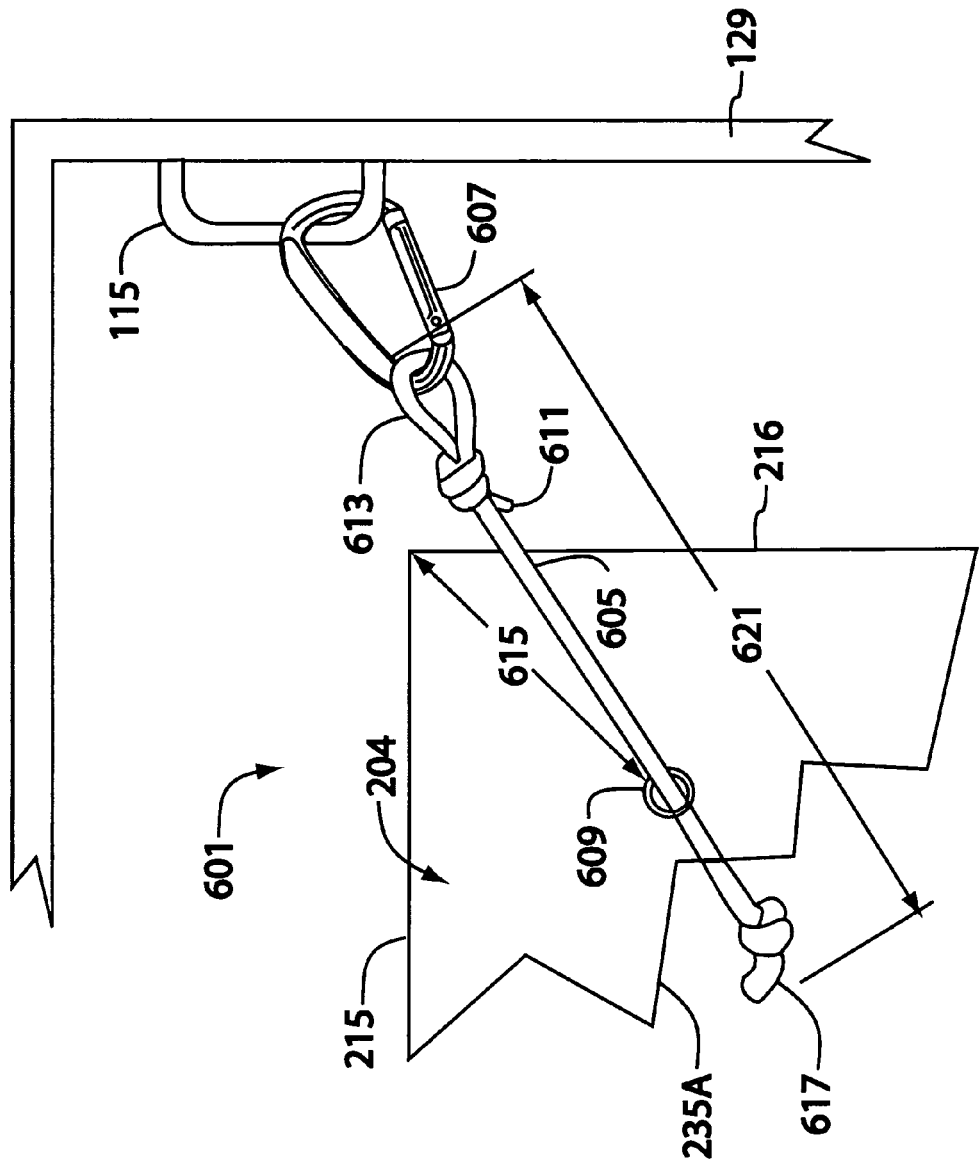
FIG. 6A illustrates elastic cord anchor.
Figure 6B:
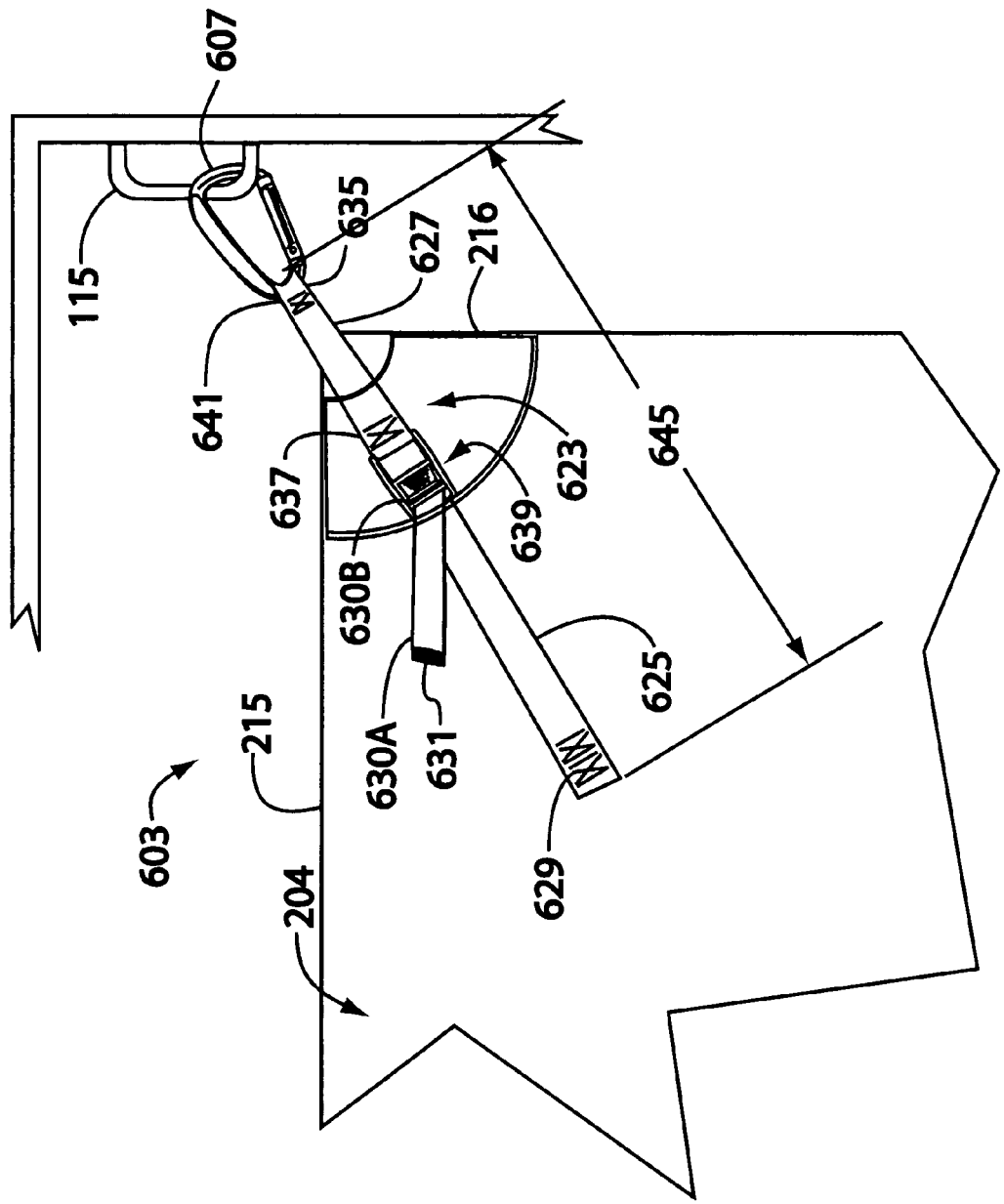
FIG. 6B illustrates belt anchor strap.
Figure 6E:
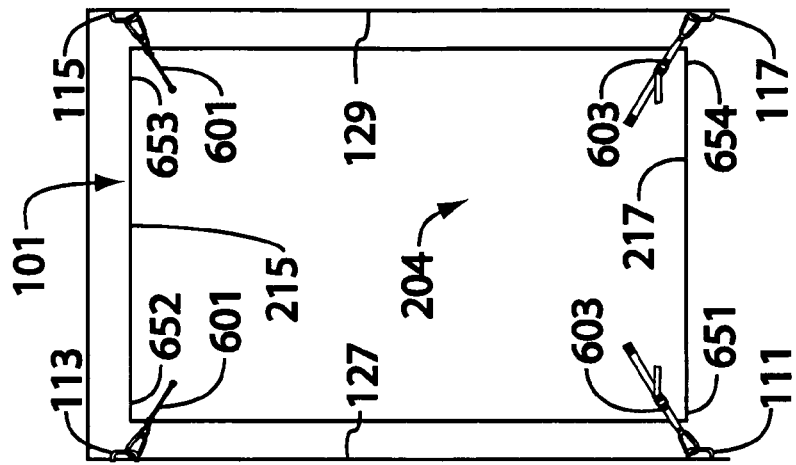
FIG. 6E illustrates use of both elastic cord anchor and belt anchor to secure main panel to pickup bed.
Figure 6D:
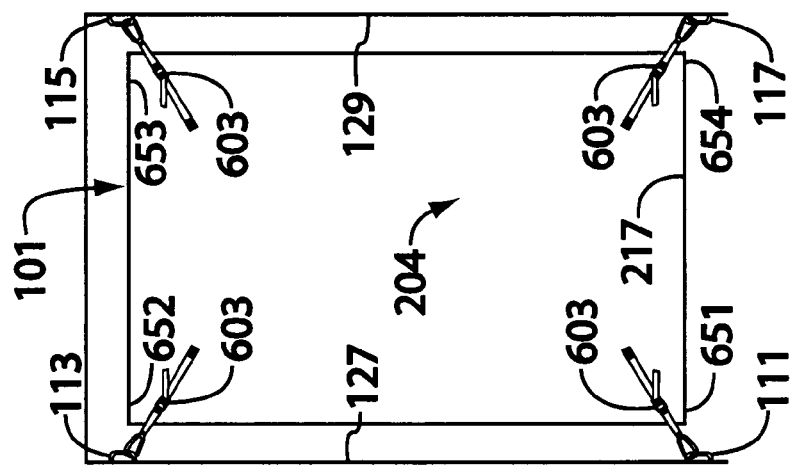
FIG. 6D illustrates exclusive use of belt anchor to secure main panel to pickup bed.
Figure 6C:
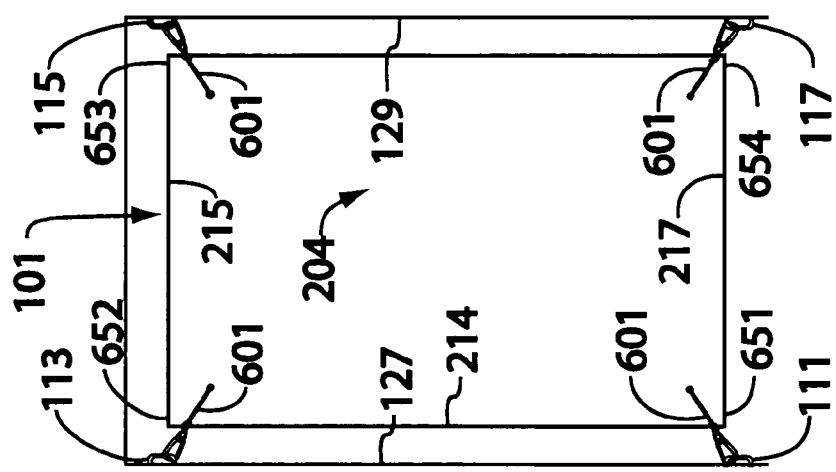
FIG. 6C illustrates exclusive use of elastic chord anchor to secure main panel to pickup bed.

The main panel anchors comprise two anchor devices: an elastic cord anchor 601 and a belt anchor 603, FIGS. 6A and 6B. The main panel 204 may be connected to the bed of a pickup by a pair of each anchor device, or by two pairs of either device, as illustrated in FIGS. 6C,D, and E. Regardless, the use of the load tie-down/pull-strap element 401 and belt guides 234 are common to the all uses of the two types of corner anchors.

As illustrated in FIGS. 6A and 6B, the elastic cord anchor 601 and the belt anchor 603 are positioned on the right front corner of the main panel 204. For reference the main panel front edge 215 and main panel right edge 216 are indicated along with the right side wall 129 of the bed, and the right front tie-down 115. This sequence repeats itself for all corners of the main panel 204.

The elastic chord anchor 601, FIG. 6A, comprises a length of elastic cord 605, a connector device (such as a carbineer or functionally similar device readily available through common commercial outlets) 607, and a grommet 609. The distal end 611 of the elastic cord 601 forms a loop 613, and the connector device 607 is connected to the loop 613. The connector device 607 releasably connects the elastic cord anchor 601 to the vehicle at the right front corner tie-down point 115. The grommet 609 is positioned and secured through the main panel 204 near a corner and at a distance 615 from the edges (215 and 216) of the main panel 204. The distance 615 varies by way of example, but not limitation, from less than 1 to 3 inches (less than 2.5 to 7.5 cm). The proximal end 617 of the elastic cord passes through the grommet 609 and is secured against the grommet at the inner surface 235 of the main panel 204 by a knot or other comparable means. The length of the elastic cord 621 varies from 0.5 to 3.0 feet (15 cm to 1 m) with the total length ranging, but not limited to from 2.5 to 3.5 feet (76 to 107 cm). The elastic cord varies in diameter from 0.25 to 0.50 inch (0.6 to 1.25 cm) and is commercially available and commonly recognized, for example as "bungee" cord.

The belt anchor 603, FIG. 6B, comprises a belt 623 with a first section 625 and a second section 627. The first section 625 has a proximal end 629 and a distal end 631. The distal end 631 terminates in the male element 630A of a buckle device 639. The proximal end 629 is anchored to the main panel 204 at a connection point, 1 to 3 inches (2.5 to 7.5 cm) from the edges of the main panel 204 at a corner. The second section 627 of the belt 623 comprises a proximal end 635 and a distal end 637. The female element of a buckle device 639 is attached to the distal end 637 of the second section 627. The proximal end 635 of the second section 627 forms a loop 641 secured by sewn seam or comparable attachment means, and a connector device 607 (a carbineer or similar device, for example) is positioned in and connected to the loop 641 as illustrated. The male element 630A of the buckle device 639 and the female element 630B of the buckle device 639 mechanically connect to join the first section 625 and second section 627 of the belt 623. The effective total length 645 of the belt 623 is adjusted by extending or shortening the length of the first section 625 of the belt.

FIGS. 6C,D, and E illustrate three modes of connecting the main panel 204 to the pickup bed 101. In FIG. 6C, the elastic chord anchor 601 comprises a length of elastic chord. Each of the four corners of the main panel (left rear 651, left front 652, right front 653, and right rear 654), is connected by anchor connector 601 to a corresponding tie-down in the pickup bed 111,113,115, and 117, respectively. FIG. 6D illustrates tie-down with a belt anchor 603, and FIG. 6E illustrates use of both the elastic cord anchor 601 at the left and right front corners 652 and 653, respectively, of the bed 101 and use of the belt anchor 603 at the left and right rear corners 651 and 654, respectively, of the bed.

Figure 6F:
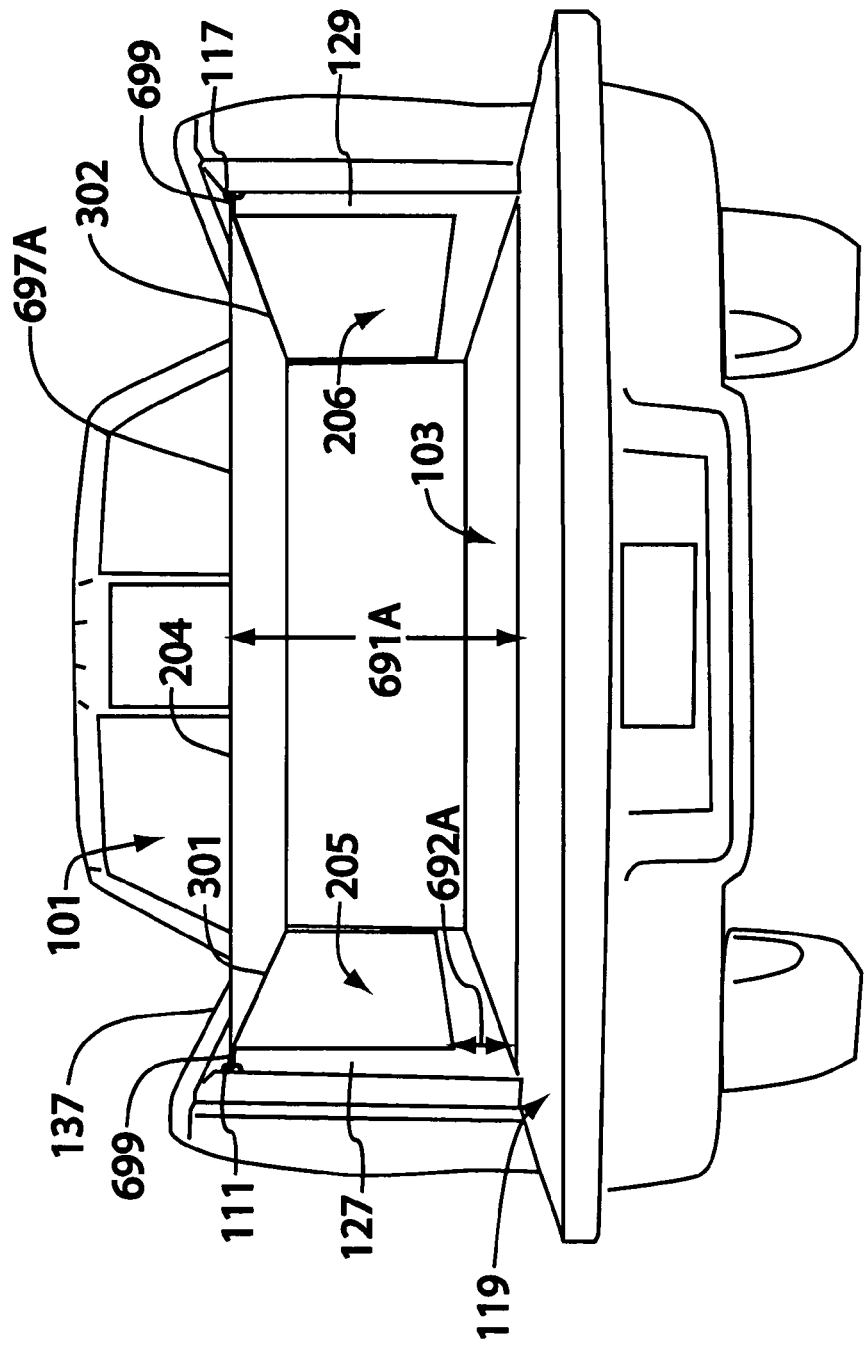
FIG. 6F illustrates position of main panel and side panels with minimum bed load.
Figure 6G:
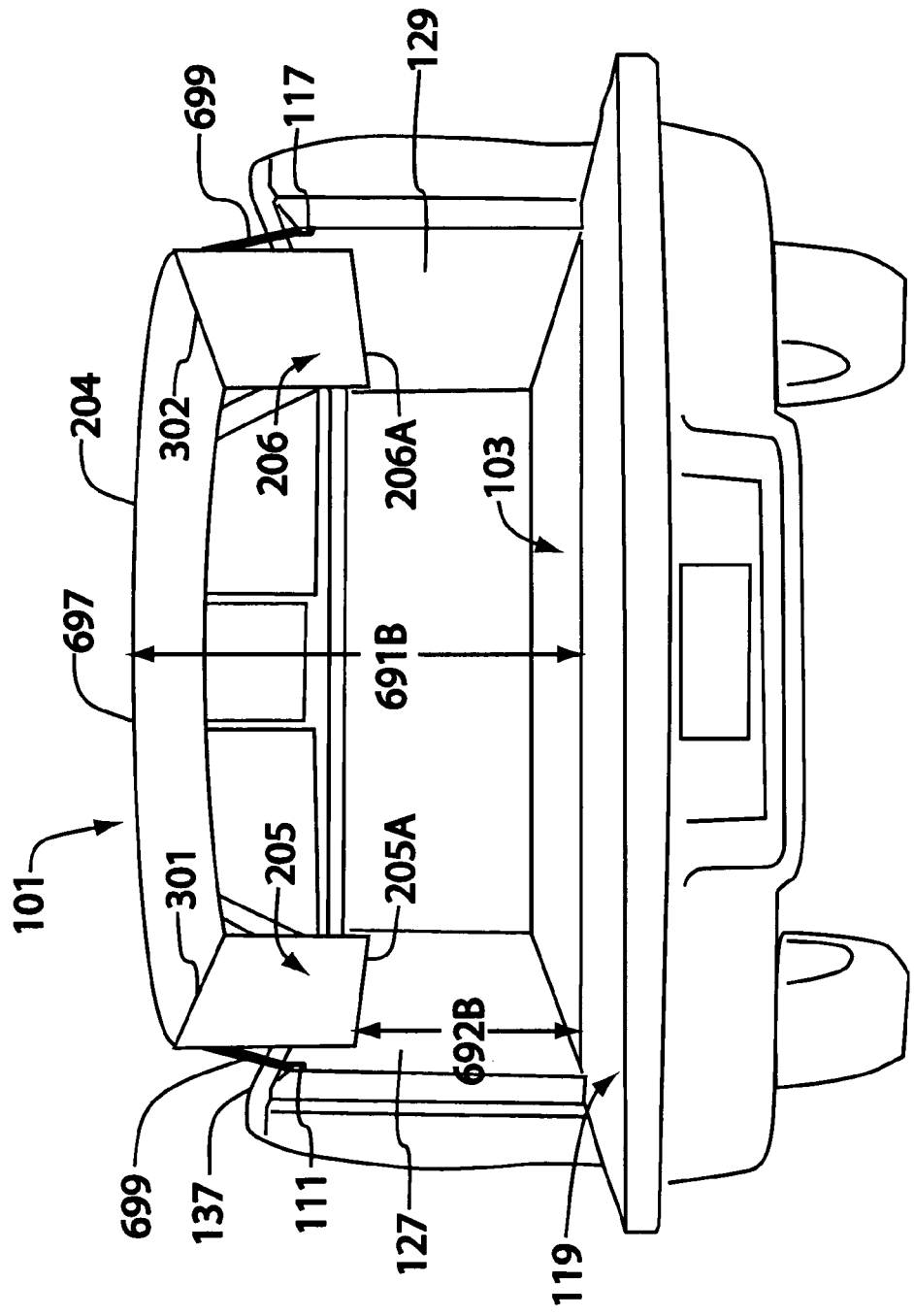
FIG. 6G illustrates extension of side panels and position of main panel and side panels with full bed load.

The elastic cord anchor allows the main panel 204 to move upward and also allows the left 205 and right 206 side panels to move upward, also, to cover loads that extend above the top edge of the pickup bed. The upward extension of the elastic cord anchors is limited to the elasticity of the cord material. The belt anchor can be lengthened by adjusting (lengthening the belt). FIG. 6F and 6G illustrate the adaptation of the main panel 204 and left 205 and right 206 side panels in response to different load heights, as measured from the floor bed. For reference, the following are identified in both FIGS. 6F and 6G: the pickup 101, the floor of the bed 103, the left 127 and right 129 side walls of the bed, the main panel 204, the left 205 and right 206 side panels, the seams connecting the main panel and left side panel 301 and the main panel and the right side panel 302, the left rear tie-down 111 and right rear tie-down 117, and the tailgate 119 all viewed from the rear of the vehicle, looking forward.

FIG. 6F illustrates a load height 691A approximately level with the upper edge of the pickup bed 137. The main panel 204 is stretched nearly flat 697A and connected by either of the anchors (601 or 603) to the bed at the rear tie downs 111 and 117. One skilled in the art recognizes that a view of the front would not differ with respect to the function of the relevant parts associated with such a front view). Seams 301 and 302 are at the approximate level of the edge of the bed 137, and the left 205 and right 206 side panels extend downward to a distance 692A above the floor 103. The main panel anchor 699 (designated here as such to indicate either of the two described above) is fully retracted, no stretching of the elastic cord, and belts are tightened to a minimum length.

In FIG. 6G, the load height is increased to 691B. The load height extends above the upper edge 137 of the pickup bed. The main panel is stretched in a shallow arc 697 (although in practice this could be peaked, depending on the shape of the load, as a person of average skill in the art understands. The seams 301 and 302 are elevated at distance comparable to the load height above the upper edge of the pickup bed 137. The anchors 699 (elastic cord anchor 601 or belt anchor 602) are extended to accommodate the increased load height 691B. In the case of the elastic cord belt, extension would be limited to the elasticity of the cord. The belt anchor is extended by lengthening the belt at the buckle. In response to the increased load height and extended anchors, as the seams 301 and 302 move upward, the left 205 and right 206 side panels move upward; Compare distance from the floor 692A in FIG. 6F with distance from the floor 692B which directly reflects the upward movement of the main panel 204. Note that the sides of the load remain covered as illustrated, because the bottom edges of the side panels 205A and 206A do not rise above the upper edge 698 of the bed. It is generally desired to keep a load fully covered and not allow the side panels to rise above the bed, but this is not a limiting condition to the invention. When properly loaded with the pull strap system 401 fully secured, the load should be reasonably secured, even if not fully covered.

The tailgate cover 207 is not equipped with panels comparable to the left 205 and right 206 side panels. See FIGS. 3A and 3B. When the height of a load requires extending the anchor devices (601 and 603) to allow the main panel to rise, the two lateral elastic tie-down cords 311A and 311B are either replaced with longer cords that will allow the tailgate cover to rise with the main panel, or adjustable belts may be used rather than elastic cords. This requires minor modification of attachment to the tail gate cover, and such modifications are anticipated in the invention and do not change the scope or intent of the invention.

Example 6

Elastic Anchor

The elastic anchor 701 comprises three basic elements: the elastic cord guide connector 702, the elastic cord terminal guide 703, and a continuous length of elastic cord 704. The elastic anchor 701 constitutes an alternative mode of connecting the bed cover 203 to the pickup bed 101 compared with the use of the elastic cord anchor, the belt anchor or a combination of the two of these as illustrated in FIGS. 6A,B, and C.

Figure 7A:
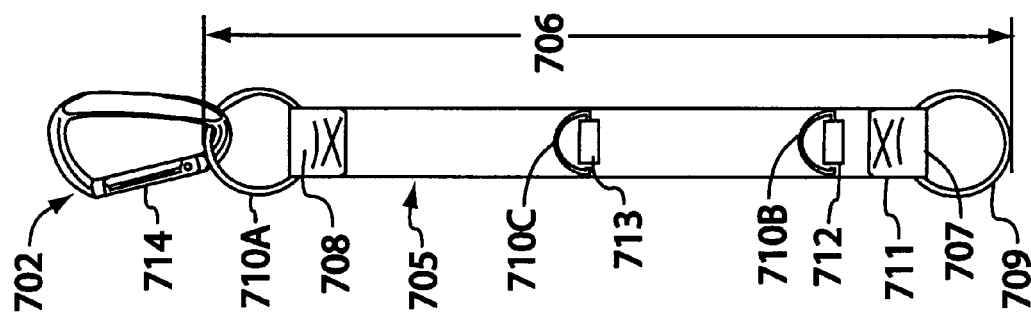
FIG. 7A illustrates elastic cord guide connector.

As illustrated in FIG. 7A, the elastic cord guide connector 702 comprises three major parts: a basic strap 705 with a length 706, a proximal end 707, and a distal end 708. A cord guide ring 709 (D-ring or circular, both of which are well known in the art and readily available in whole sale and retail hardware outlets), and a set of three anchor attachment rings 710A,B, and C.

The cord guide ring 709 is attached to the proximal end 707 of the basic strap 705 by a loop 711 formed in the proximal end of the strap. A first member 710A of the set of bed attachment rings 710A,B, and C is secured to the distal end 708 of the base strap 705; a second member 710B of the set of bed attachment rings is secured at a point 712 on the base strap 705 at a distance from the first member 710A, that distance being approximately equal to the width 213 of the left 205 and right 206 side panels. The third bed attachment ring 710C is secured to the base strap 705 at a point 713 approximately one-half of the distance between the first 710A and second 710B members of the set of bed attachment rings at a point between the first 710A and second 710B members of the set of bed attachment rings.

Figure 7B:
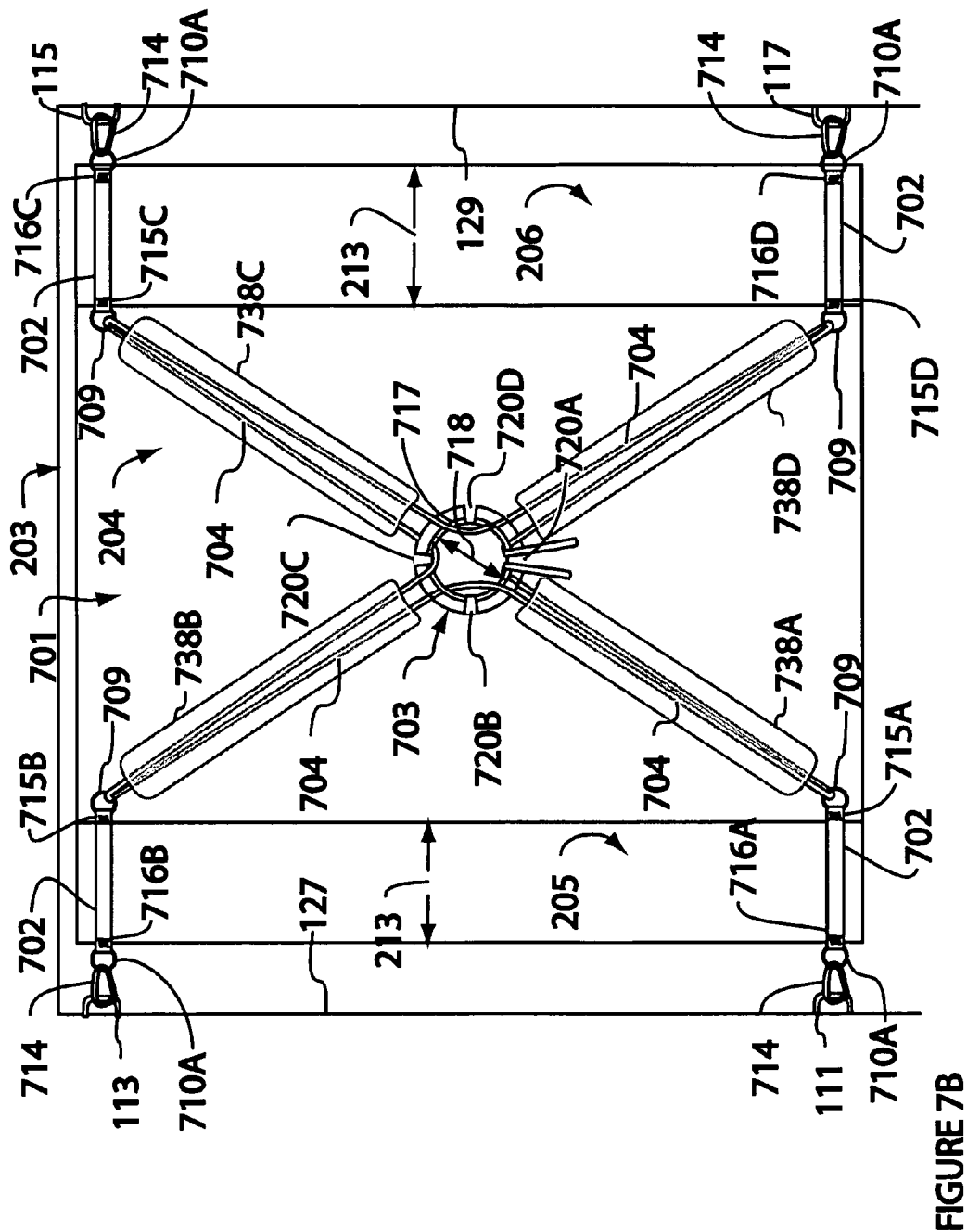
FIG. 7B illustrates main panel connected to vehicle elastic anchor.

FIG. 7B illustrates the elastic anchor 701 positioned on the bed cover 203 with the main panel 204 and the left 205 and right 206 side panels. Also indicated for reference are the left rear 111, left front 113, right front 115, and right rear 117 vehicle tie downs. An elastic cord guide connector 702 is secured by stitching (or other means including adhesives) near the left rear corner 715A of the main panel and secured along the edge 716A of the left side panel 205. Three additional elastic cord guide connectors 702 are similarly positioned at the left front 715B, right front 715C, and right rear 715D corners of the main panel 204 and corresponding edges of the adjacent left and right side panels 205 and 206, 716B, C, and D, respectively. Each elastic cord guide connector 702 is connected securely to a vehicle bed tie-down left rear 111, left front 113, right front 115 and right rear 117 by a connector device 714, such as but not limited to a carbineer (or similar device readily available from hardware and/or similar commercial outlets).

The connector device 714 is releasably connected to one of the set of three bed attachment rings 710A, 710B, or 710C; generally the same ring would be selected to attach each of the four elastic cord guide connectors 702, although this is not a requirement, and varying the point of attachment allows for variation in the height/shape of the load to be covered and secured in the vehicle bed. Attachment using anchor ring 710A allows the main panel 204 to rise and a taller load may be covered; whereas attachment using bed attachment ring 710B pulls the main panel 204 tightly across the vehicle bed when the continuous length of elastic cord 704 is tightened. See FIGS. 7C and 7D and 6F and 6G.

Figure 7C:
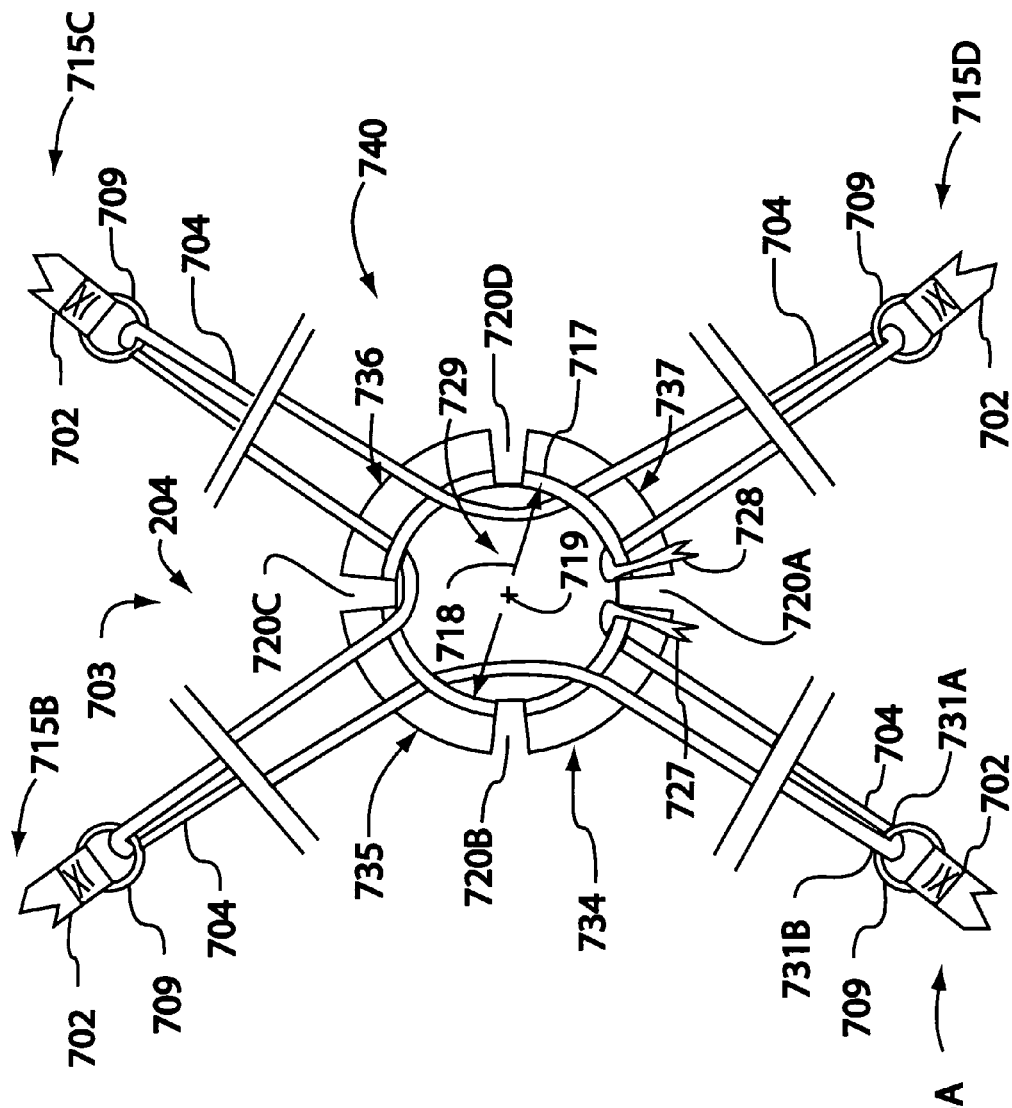
FIG. 7C illustrates connection of continuous length of elastic cord to elastic cord guide connector and to elastic cord terminal guide.
Figure 7D:
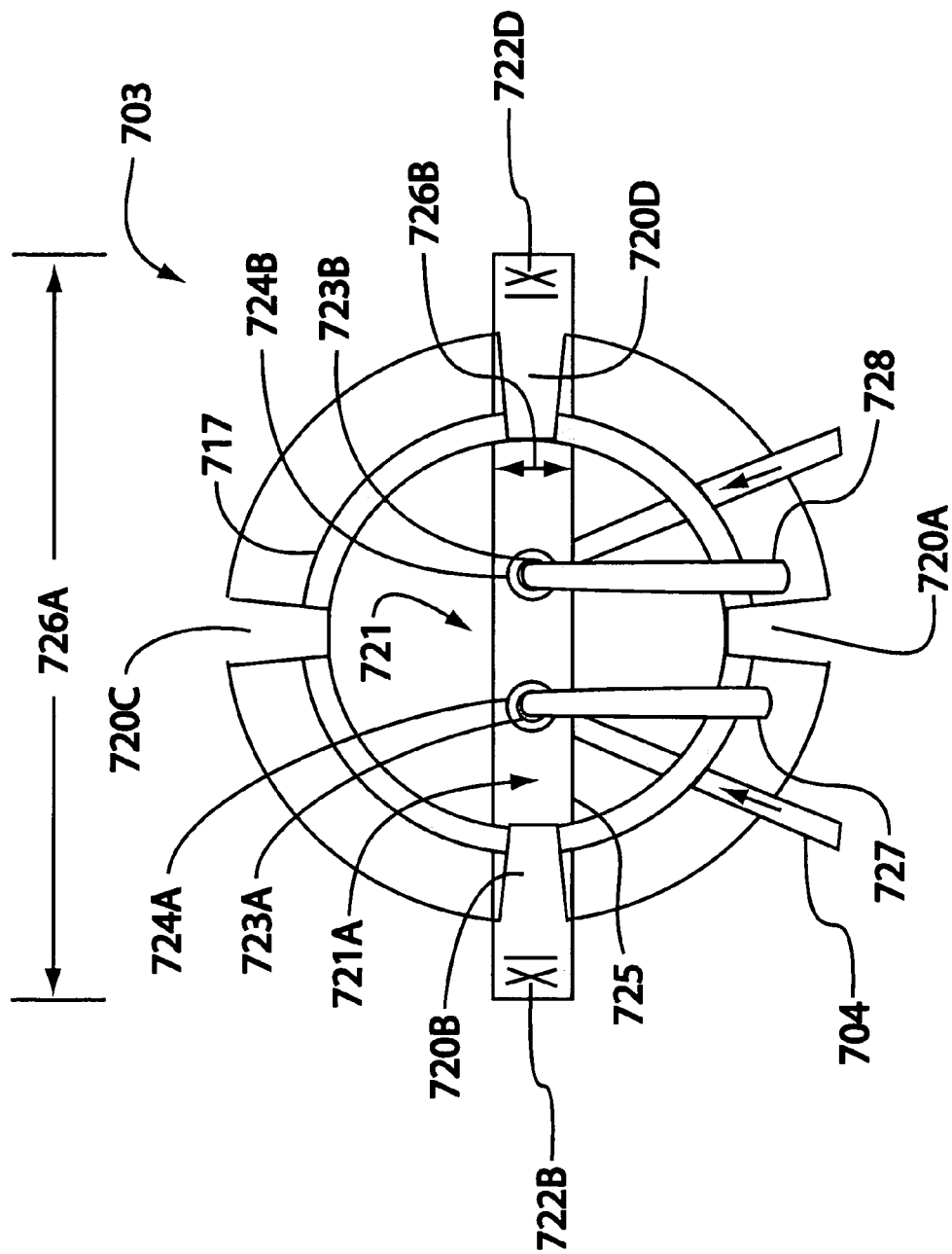
FIG. 7D illustrates cord stay device.

As illustrated in FIGS. 7B and 7C, the elastic cord terminal guide 703 comprises a solid ring 717 with a diameter 717B an open lumen 729 limited and defined by the structural surface 717A of the solid ring. Although illustrated as a circle, one skilled in the art recognizes that the ring could be oval or other form without expanding or modifying the scope or intent of the invention, and such other forms are hereby included in the concept of the ring as a circle.

The solid ring 717 is securely fastened to the main panel 204 centered at a point 719 at the approximate center of the upper surface of the main panel 204 by stitching (or comparable means well known to those of average skill in the art) at four points 720A, 720B, 720C, and 720D. Each point is approximately 90 degrees around the circumference of the ring from both adjacent points. The inside diameter 718 the solid ring 717 varies from 3 to 6 inches (7.5 to 15.0 cm), by way of illustration, not limitation. The four anchor points 720A,B,C, and D in pairs form elastic cord passages 734 (between 720A and B), 735 (between 720B and C), 736 (between 720C and D) and 737 (between 720D and 720A). The connection between the continuous length of elastic cord 704, the elastic cord guide connectors through engagement with the cord guide ring, and the elastic cord terminal guide resulting from connection between the elastic cord terminal guide and continuous length of elastic cord the function of the elastic anchor device is best comprehended and most readily illustrated by the path of connection of the continuous elastic cord.

The continuous length elastic cord 704 engages both the solid ring 717 and each elastic cord guide connector 702 by connection with cord guide ring 709 as follows, tracing the path of the first end 728 of the continuous length of elastic cord 704 from the position of the second end 727 as illustrated in FIG. 7C. The first end 728 passes over the solid ring in passage 734 engages cord guide ring 709 of the elastic cord guide connector 702 positioned at the left rear corner 715A of the main panel 204 by looping under, through, and over the cord guide ring 709 as illustrated, and passing over the solid ring 717, around anchor point 720B and then passing under the solid ring 717 via passage 735, thereby the continuous length of elastic cord 704 engages the solid ring in the section between anchor points 720A and 720B; the continuous length of elastic cord 704 continues, looping under, through, and over guide ring 709 of the elastic cord guide connector 702 positioned at the left front corner 715B of the main panel 204, and following the same to engage all four segments of the solid ring and the cord guide ring associated with each of the four elastic cord guide connectors 702. In the final step, the first end 728 of the continuous length of elastic cord 704 passes from the right rear corner 715D over the solid ring, and the first 728 and second 727 ends of the continuous length of elastic cord are positioned as illustrated in FIG. 7C. Note, in FIG. 7C, the first end 728 and the second end 727 of the continuous length of elastic cord 704 are shown as they are positioned when the continuous length of elastic cord is fully engaged; the first end 728 started at the point at which the second end 727 is positioned when engagement is properly completed.

In an optional, but preferred configuration, the continuous length of elastic cord 704 passes through sleeves that orient the continuous length of elastic cord 704 at each corner 715A (left rear), 715B (left front, 715C (right from), and 715D (right rear) respectively by sleeves 738A, 738B, 738C, and 738D as the continuous length of elastic cord extends to and from the corresponding elastic cord guide connector 702. Each sleeve may be fabricated from the same material as the main panel and the long edges of each sleeve are secured to the main panel by stitching or other comparable means.

The first 728 and second 727 ends of the continuous length of elastic cord 704 must be connected to complete engagement with the elastic cord guide connectors and with the elastic cord terminal guide. This is simply accomplished by joining the ends with an appropriate knot (or clamp device known to those in the art and readily available through commercial outlets). Prior to joining the ends, to complete engagement of the continuous length of elastic cord 704 with the elastic cord connector 702, and terminal guide 703, the first end 728 and second end 727 engage a cord stay 721 and are connected on the exterior side 721A of the cord stay 721. The cord stay comprises a stay body 725 with a length 726A greater than the outer diameter of the solid ring 717 and a width 726B of from 2 to 4 inches (5 to 10 cm). The stay body is fabricated from a heavy belt material, or preferably form the material from which the main panel is fabricated. Grommets 724A and 724B re-enforce two openings 723A and 723B that extend through the stay body 725. The stay body 725 extends across the diameter of the solid ring at two opposing points of attachment (720B and 720D) and is secured at each end 722B and 722D to the solid ring 717. The first 728 and second 727 ends of the continuous length of elastic cord 704 extend respectively from the first 723A and second 723B openings on the exterior surface 721A of the stay body 721. Prior to joining the ends, a toggle device 741 may be positioned to secure tension applied to the continuous length of elastic cord 704.

The elastic anchor 701 functions as follows when the bed cover is in place as follows. The tie-down/pull strap element 401 is positioned on the floor of the bed. The left side of the main panel is attached by corresponding elastic cord anchor and guide elements 702 to the left rear 111, left front 113 tie downs by connector devices 714 connected to one of the bed attachment rings 710A,B, or C. The elements of the belt system are appropriately positioned through belt guides 234. Material to be transported in the bed and covered by the bed cover is loaded into the bed 101, on top of the pull straps 403. The main panel 204 and left 205 and right 206 side panels are positioned over the top of the load and down the side. The right side of the main panel is attached to the bed in the same manner as the left side. The maximum height to which the side panels may extend is limited by the bed attachment anchor ring 710A,B, or C to which connectors are attached.

The first 728 and second 727 ends of the continuous length of elastic cord 704 are pulled upward, tightening the cord 704 and exerting tension on the four elastic cord guide connectors 702, and effectively pulling the main panel 204 from each corner upward and towards the center.

Figure 7E:
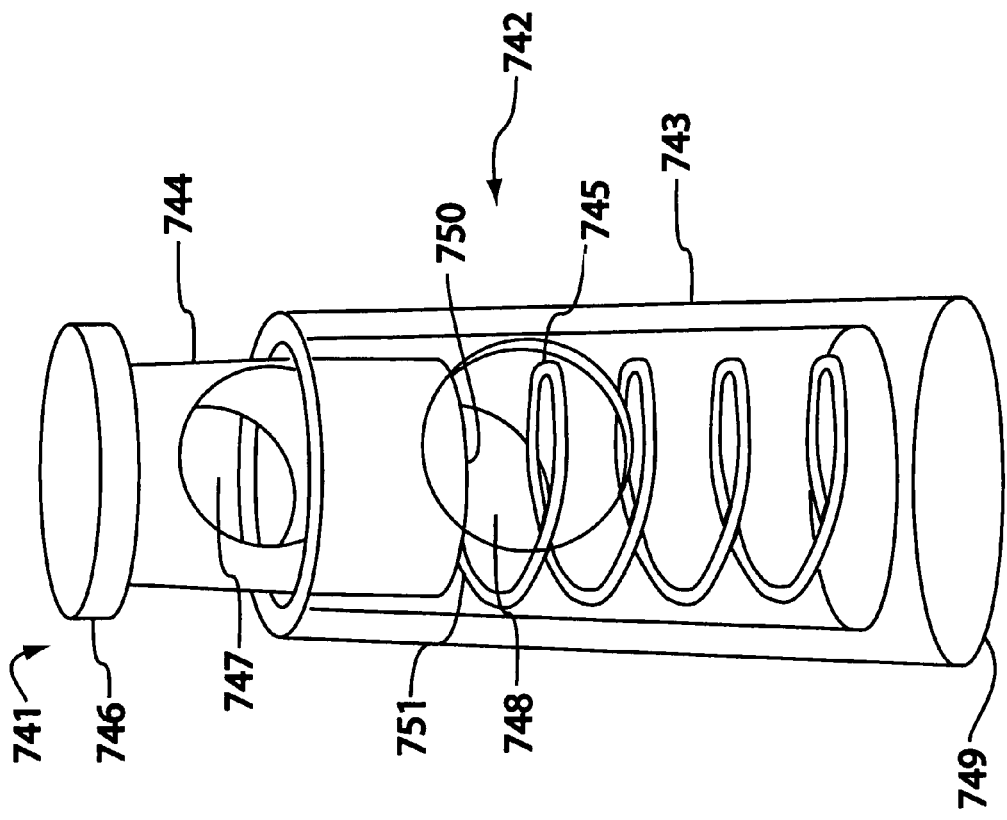
FIG. 7E illustrates structure and function of toggle device.

As the main panel elevates in response to tightening the cord over the load, the side panels are pulled upward. See FIGS. 6G and 6H. Maximum extent of elevation is determined by the point of attachment of the connectors 714 with a specific bed attachment anchor ring 710A,B, of C. Attachment to ring 710A allows greatest rise, and to ring 710B minimal rise, noting that elasticity of the cord 704 allows a limited rise, regardless of the bed attachment ring selected. To maintain the tension, the stretched continuous length of elastic cord 704 must be secured against the stay body 725. This may be accomplished by knotting the stretched continuous length of elastic cord against the stay body; however, in practice, the use of a spring loaded rope clamp 741 (as well known in the art) is preferred, FIG. 7E. The toggle device 742 comprises an outer barrel 743, an inner barrel 744, a spring 745, an inner barrel cap 746, an inner barrel cord passage 747, an outer barrel cord passage 748, and a base 749 The spring 745 is positioned in the outer barrel 743 with one end contacting the base 749. The inner barrel 744 is positioned in the outer barrel 743 with the inner barrel base 750 contacting the top of the spring 751.

Pressure on the inner barrel cap 746 forces the inner barrel into the outer barrel 743. The inner barrel passage 747 aligns with the outer barrel passage 748 producing a tunnel traversing both barrels. Both ends 728 and 727 of the continuous length of elastic cord 704 are passed through the tunnel, and the toggle device is moved to contact the stay device 721 to minimize slack in the elastic cord between the toggle and stay. When pressure is released from the inner barrel cap 746 the spring forces the inner barrel upward, and the elastic cord is securely clamped by the inner barrel 747 and outer barrel 748 passages as they move out of alignment. Downward pressure on the inner barrel clamp 746 releases the clamp.

One of average skill in the art recognizes that the ends 728 and 727 of the continuous length of elastic cord 704 are positioned in (or through) the toggle before they are connected (knotted or by a clamp (many of which are readily available from commercial outlets). The continuous length of elastic cord 704 is positioned only once on the main panel; the knot or clamp prevents the cord 704 from being pulled back through the elastic cord terminal guide 703.

With the bed cover in place, the tail gate cover 207 is positioned as previously described, or if the tailgate is closed, the tailgate cover is folded and held in place by adhesive strips or placed in a pocket in the main panel for storage.

It should be noted that if the rear panel 301 and associated closures are to be used, that are attached after the main panel is attached; otherwise they remain folded and tucked behind the tailgate or attached to the underside of the main panel.

I claim:

1. A vehicle bed cover, pull strap/tie down, and attachment system comprising:
    a fabric element comprising a bed cover and a tail gate cover, wherein said bed cover comprises a main panel, a right and a left side panel wherein, said left side panel and said right panel are attached to corresponding edges of said main panel, and further wherein said tailgate cover comprises a rear cover panel and a left rear and a right rear side panel, wherein said rear cover panel is connected to said main panel, and further wherein said left rear and said right rear side panels are connected to corresponding edges of said rear cover panel, and further wherein members of two sets of belt guides are functionally positioned and connected to an inner surface of said main panel;
    a load tie-down/pull-strap system comprising a central strap and a first and a second belt, separately attached to said central strap, and further wherein both said first and said second belts comprise a short and a long arm, and further wherein said long arm of each of said first and of said second belts is adapted to engage the members of a set of said belt guides, and further wherein said long arms are adapted to connect to the corresponding short arm; and,
    a main panel attachment system comprising an attachment unit comprising a flexible body with a connector device attached to a first end of said flexible body, and further comprising an attachment point positioned near each of respective corners of said main panel and adapted to secure a second end of said flexible body, and finally comprising a structural means to alter a length of said flexible body.

2. The vehicle bed cover, pull-strap/tie-down, and attachment system of claim 1 wherein each of members of a set of four attachment units comprises a length of elastic cord with a first end a second end wherein a connector device is attached to said first end of said cord a grommet is positioned at each of said attachment points of each of said corners of said main panel and wherein said second end of said elastic cord is passed through said grommet and secured by a knot such that said length of elastic cord is securely attached to said main panel.

3. The vehicle bed cover, pull-strap/tie-down, and attachment system of claim 1 wherein each of members of four attachment units comprises a belt, said belt comprising a first section and a second section, wherein said first section has a proximal end and a distal end, and further wherein said distal end terminates in a male element of a buckle device, and still further wherein said proximal end is securely attached to said main panel at one of connecting points; and further wherein a female element of a buckle is attached to a distal end of said second section of said belt and a connection device adapted for engaging a tie-down device in a bed of a pick-up truck is secured in a loop formed in a proximal end of said second section of said belt, and wherein said female element of a buckle at the distal end of said second section of said belt engages said male element of a buckle device at the distal end of said first section of said belt, thereby connecting said main panel to said pick-up truck bed, and by adjusting a slack length of said first section of said belt to thereby control a vertical orientation of said main panel.

4. The vehicle bed cover, pull-strap/tie-down, and attachment system of claim 1 wherein said bed cover attachment system comprises an elastic anchor comprising an elastic cord guide (702), an elastic cord terminal guide (703), and a continuous length of elastic cord (704), wherein said elastic cord guide comprises a base strap comprising a guide cord ring attached to a proximal end of said base strap, and a set of three bed attachment rings, wherein, a first member of said set of three bed attachment rings is secured to a distal end of said base strap, a second member and third member of said set of bed attachment rings are attached to the base strap with the third member of said set equally spaced between the first and second members of said set, and the second member of said set spaced a distance from said first member of said set effectively equal to a width said side panels; an elastic cord guide is secured near each of said corners of said main panel and secured along the edge of an adjacent one of said side panels; further, wherein said elastic cord terminal guide comprises a solid ring, wherein said solid ring is centered in a center of an upper surface of said main panel and is secured at four equally spaced points, each of said points being 90° degrees from both of two adjacent ones of said points; further, whereby each pair of adjacent points forms and limits an elastic cord passage; said continuous length of elastic cord engages said solid ring at one of said elastic cord passages by looping around a body of said solid ring at said one of said cord passages and next engages the cord guide ring of a corresponding terminal guide, and in sequence engages a next, adjacent elastic cord passage and corresponding terminal guide, finally connecting said solid ring at said elastic cord passages to said main panel by engaging each of said elastic cord guides; said bed cover and attachment system further comprises a cord stay wherein a distal end and a proximal end of said continuous length of elastic cord traverse said cord stay and contact an upper surface of a cord stay plate; the distal and proximal ends of said continuous length of elastic cord pass through lockable openings in a lock device that prevents said distal and proximal ends of said continuous length of elastic cord from retracting into a lumen of said cord stay plate.

* * * * *